United States Patent
Bastioli et al.

(12)

(10) Patent No.: US 6,841,597 B2
(45) Date of Patent: Jan. 11, 2005

(54) TERNARY MIXTURE OF BIODEGRADABLE POLYESTERS AND PRODUCTS OBTAINED THEREFROM

(75) Inventors: Catia Bastioli, Novara (IT); Gianfranco Del Tredici, Sesto Calende (IT); Italo Guanella, Romentino (IT); Roberto Ponti, Oleggio (IT); Claudio Russo, Novara (IT)

(73) Assignee: Novamont S.p.A., Novara (IT)

( * ) Notice: Subject to any disclaimer, the term of this patent is extended or adjusted under 35 U.S.C. 154(b) by 405 days.

(21) Appl. No.: 10/057,607

(22) Filed: Jan. 25, 2002

(65) Prior Publication Data

US 2002/0151618 A1 Oct. 17, 2002

(30) Foreign Application Priority Data

Jan. 25, 2001 (IT) ..................... TO2001A0060

(51) Int. Cl.[7] ............. C08L 3/02; C08L 3/04; C08G 63/16; C08G 63/06; B32B 27/08
(52) U.S. Cl. ............ 524/47; 525/444; 525/450; 528/302; 528/354; 528/361; 428/480
(58) Field of Search ................. 525/444, 450; 528/302, 354, 361; 524/47; 428/480

(56) References Cited

U.S. PATENT DOCUMENTS 5,268,507 A * 12/1993 Brake ................ 564/203
6,096,855 A * 8/2000 Sodergard et al. ......... 528/354

FOREIGN PATENT DOCUMENTS

| EP | 0 327 505 | 8/1989 |
|----|-----------|--------|
| EP | 0 400 532 | 12/1990 |
| EP | 0 965 615 | 12/1999 |
| EP | 0 980 894 | 2/2000 |
| WO | 90/10671 | 9/1990 |
| WO | 92/19680 | 11/1992 |
| WO | 99/28367 | 6/1999 |

* cited by examiner

Primary Examiner—Tae H. Yoon
(74) Attorney, Agent, or Firm—Connolly Bove Lodge & Hutz LLP; Larry J. Hume

(57) ABSTRACT

The invention relates to a mixture of biodegradable polyesters comprising: (A) a polyhydroxy acid of the poly-ε-caprolactone type and its copolymers, (B) aliphatic polyester, and (C) a polymer of polylactic acid, in which the concentration of (A) varies with respect to (A+B) in the range between 40 and 70% by weight, and the concentration of (C) with respects to (A+B+C) lies between 2 and 30%.

25 Claims, No Drawings

TERNARY MIXTURE OF BIODEGRADABLE POLYESTERS AND PRODUCTS OBTAINED THEREFROM

The present invention relates to mixtures of biodegradable polyesters comprising at least three polyesters in proportions such that it is possible to obtain biodegradable films with improved characteristics with respect to the individual starting polyesters and, in particular, with significant properties of UV resistance, biaxial strength, that is longitudinally of and transverse the film-forming direction, and transparency, as well as biodegradability.

Films obtained from such mixtures are particularly useful as mulching films, in particular in the case of transparent films, or as layers for multi-layer film for improving the properties of UV resistance of the multi-layer film. Films can also be useful in food packaging or in bags for silage and for various applications.

PRIOR ART

Conventional polymers such as low and high density polyethylene are characterised not only by an excellent flexibility and water resistance, but also by good transparency and optimum resistance to tearing. These polymers are used, for example, for sacks and bags, as packaging material and in the form of film for agricultural mulching. However, their low biodegradability has created a visual pollution problem which has been increasing in recent decades.

In the field of transparent film for mulching the need to combine a high strength, a rapid biodegradability and a UV resistance which allows the film to remain on the ground for at least one hundred and twenty days has made it difficult to identify biodegradable materials suitable for this purpose.

Polymers such as L-polylactic acid, D, L-polylactic acid, D-polylactic acid and their copolymers are biodegradable thermoplastic materials, obtained from a renewable source, which are transparent and have excellent resistance to fungi and are therefore suitable for packaging food as well as for the preservation of its organoleptic characteristics. The said materials, however, biodegrade slowly in the ground and even in compost degrade quickly only at high temperatures. The major limitation, however, is in the lack of tear resistance of thin films obtained in normal blown or cast head film-forming conditions. Moreover, their high rigidity makes them unsuitable as films for mulching, bags for food, refuse sacks and other films for packaging, which require high characteristics of strength. Their UV resistance on the other hand is excellent.

If polyesters constituted predominantly of monomers from renewable sources starting from diacids and diols, for example polymers of sebacic, brassylic and azelaic acid are considered, these have the enormous limitation of a strong anistropy in terms of tear resistance between the longitudinal and transverse directions and, moreover, are characterised by a very low longitudinal tear resistance. For this reason films prepared from these resins are also inadequate for use as mulching, as refuse sacks etc. Their UV resistance is good, even if lower than the UV resistance of polylactic acid, whilst the rapidity of biodegrading is comparable with that of polylactic acid.

Polymers such as poly-ε-caprolactone and its copolymers, when in film form, also tend to become orientated in the longitudinal direction exhibiting further limits of filmability. As further limitations they tend to biodegrade very quickly, especially in the ground. The UV stability is similar to that of the above-described polymers from diacid-diol.

Binary mixtures of polylactic acid and aliphatic polyesters have been the subject of many patents. In particular, EP-0 980 894 A1 (Mitsui Chemical) describes a significant improvement in tear resistance and balancing of the mechanical properties in film produced by the mixture of polylactic acid and polybutylen succinate in the presence of a plasticiser.

Those described, however, are non-transparent films, with a very modest strength, of the order of 120 g in accordance with the JIS P8116 method. The presence of a plasticiser, moreover, places limitations on the use of the film in contact with food and, because of the ageing phenomena, on use in the agricultural mulching sector.

U.S. Pat. No. 5,883,199 describes binary mixtures of polylactic acid and polyester, with a polylactic acid content between 10 and 90% and the polyester in a continuous or co-continuous phase. Such mixtures, according to the described examples, have very low values of tear resistance.

OBJECT, CHARACTERISTIC AND ADVANTAGES OF THE INVENTION

Starting from the problem of finding a biodegradable material able to combine properties of transparency, tear resistance, UV resistance and complete biodegradability, but with a rapidity of biodegrading compatible with applications such as transparent mulching, it has now been surprisingly found that by combining the three different types of polyesters described (polymer of lactic acid, polyester deriving from diacids/diols and polyhydroxy acids of the poly-ε-caprolactone type) in specific ratios there is a critical range of compositions in which it is possible to obtain a tear strength in the two directions comparable with conventional plastics materials such as polyethylene, a modulus of elasticity with values lying between those of low and high density polyethylene, and a high UV stability greater than that of polyesters from diacids/diols and of poly-ε-caprolactone, and entirely similar to that of polylactic acid even for very low concentrations of polylactic acid. It is moreover found that the ternary mixture of polyesters according to the invention is able to maintain a transparency comparable with that of the individual starting materials even after stretching.

DESCRIPTION OF THE INVENTION

The invention relates to a mixture of biodegradable polyesters comprising:

(A) a polyhydroxy acid of the poly-ε-caprolactone type and its copolymers with a molecular weight $M_w$ greater than 50,000; a polyester of the diacid/diol type with a molecular weight $M_w$ greater than 40,000 and more preferably greater than 60,000, and a melting point lying between 50° C. and 95° C., preferably between 55° C. and 85° C., more preferably between 57° C. and 80° C.;

(B) a polymer of polylactic acid which contains at least 75% of L-lactic or D-lactic acid or their combinations, with molecular weight $M_w$ greater than 30,000; in which the concentration of A varies with respect to (A+B) in the range between 40–70% by weight, and the concentration of C with respect to (A+B+C) lies between 2–30%, preferably between 5 and 25% by weight.

More particularly, in the mixture according to the invention:

(A) The polyhydroxy acid is biodegradable according to the CEN 13432 regulation, has (at T=23° C. and a Relative Humidity of 55%) a modulus lying between 150 MPa and 1000 MPa, longditudinal breaking elongation greater than 400% for film produced by blown film formation having a thickness of 25–30 μm and tested within 3 days from filming;

(B) The diacid/diol aliphatic polyester has (at T=23° C. and Relative Humidity of 55%) a modulus of elasticity lying between 200 and 900 MPa and breaking elongation greater than 200%, more preferably greater than 300% for film with a thickness of 25–30 μm produced by blown film formation and tested within 3 days from production;

(C) The polymer of the polylactic acid has a modulus of elasticity greater than 1,500 MPa.

The mixture of biodegradable polyesters according to the invention is obtained by a process which involves working in a twin screw or single screw extruder in temperature conditions lying between 140 and 200° C., with a single step procedure or even with a separate mixing and subsequent film-forming process.

In the case of a film-forming process separate from the mixing process, the said operation is achieved with the use, for film-forming, of conventional machines for extrusion of polyethylene (low or high density) with a temperature profile in the range between 140 and 200° C. and preferably between 185 and 195° C., a blowing ratio normally in the range 1.5–5 and a stretching ratio lying between 3 and 100, preferably 3 and 25, and allows film to be obtained with a thickness between 5 and 50 μm.

The said films, in the case of thicknesses lying between 25–30μm, have characteristics of tear resistance by the Elmendorf test in the two directions, of between 5 and 100 N/mm, more preferably between 7 and 90 N/mm and still more preferably between 10 and 80 N/mm, with a ratio between the transverse Elmendorf values and the longditudinal values lying between 4.5 and 0.4 and more preferably between 3 and 0.5.

Such films have a modulus of elasticity lying between 200 and 1200 MPa, more preferably between 300 and 1000 MPa, are biodegradable in the ground and in compost.

Such films have characteristics of transparency expressed as transmittance at the entrance port measured on the HAZEGUARD SYSTEM XL-211 in the range between 85 and 95% when filmed at a head temperature lying between 185 and 200° C.

Moreover, the average reduction in the tensile properties after 216 hours of exposure of the film of 25–30 μm to a Philips ultraviolet lamp TL20W/12 is less than 30% considered as the average of the reduction in the breakage load, the reduction in the breakage elongation and the reduction in the longditudinal breakage energy (measured according to ASTM D 882-91).

In the mixture phase polymers of type (A) are preferred with MFI (standard ASTM D 1238-89) lying between 1 and 10 dg/min, polymers of type (B) with MFI lying between 1 and 10 dg/min and polymers of type (C) with MFI lying between 2 and 30 dg/min.

The family of polymers of type (A) include polyesters obtained from hydroxy acids such as ε-caprolactones and mixtures thereof with other monomers, and hydroxy acids or diacids/diols, or even with pre-polymers to obtain block polymers. They also include polycaprolactones with star structure or branched in any way, chain extended or partially cross linked.

The polymer (B) is constituted by dicarboxylic acids and diols and possibly by hydroxy acids. Examples of diacids are oxyalic, malonic, succinic, gluteric, adipic, pimelic, suberic, azelaic, sebacic, brassylic, undecandioic and dodecandioic acids. Azelaic acid, sebacic acid and brassylic acid and their mixtures are particularly preferred.

Specific glycols are ethylene glycol, diethylene glycol, triethylene glycol, polyethylene glycol, 1,2- and 1,3-propylene glycol, dipropylene glycol, 1,3-butandiol, 1,4-butandiol, 3-methyl-1,5-pentandiol, 1,6-hexandiol, 1,9-nonandiol, 1,11-undecandiol, 1,13-tridecandiol, neopentylglycol, polytetramethylene glycol, 1,4-cyclohexan dimethanol and cyclohexandiol. These compounds can be utilised alone or in mixture.

Typical hydroxy acids include glycolic acid, lactic acid, 3-hydroxy butyric, 4-hydroxy butyric, 3-hydroxy valeric, 4-hydroxy valeric and 6-hydroxy caproic acid, and further include cyclic esters of hydroxycarboxylic acid such as glycolides, dimers of glycolic acid, ε-caprolactone and 6-hydroxycaproic acid. These compounds can be used alone or in mixtures. All the compounds described above are combined in such a way as to form polyesters with the mechanical characteristics of tensile resistance to elongation greater than 200% and preferably greater than 300% and modulus of elasticity lying between 200 and 900 MPa on blown films of at least 25–30 μm thickness and with a melting point between 50 and 95° C., preferably between 55 and 85° C. and more preferably between 57 and 80° C.

The polymers of type (B) also include polyamide polyesters where the polyester part is as described above and the polyamide part can be caprolactame, and aliphatic diamine such as hexamethylene diamine or even an amino acid. The polyesters of type (B) can also contain aromatic diacids in quantities less than 5 mole %. Polymers of type (B) also include polycarbonates.

Biodegradable polyesters forming part of the mixture according to the invention can be polymerised by polycondensation or, as in the case of glycolides and lactones, by ring opening, as is known in the literature. Moreover, the polyesters can be polymers branched with the introduction of polyfunctional monomers such as glycerine, epoxydized soya oil, trimethylol propane and the like or polycarboxylic acids such as butantetracarboxylic acid. Moreover, the polyesters of type (A), (B) or (C) may also have additives such as chain extenders, difunctional, trifunctional or tetrafunctional anhydrides such as maleic anhydride, trimellitic or pyromellitic anhydrides, with epoxy, isocyanate, aliphatic and aromatic groups.

Regrading with isocyanates can take place in the molten state for the purpose of the polymerisation reaction or in the extrusion phase, or in the solid state as described in the Novamont patent WO 99/28367. The three types of polymers (A), (B) and (C) can also have additives such as chain extenders or cross linking agents of the type described above added to them in the mixing phase.

The material obtained from the mixing of the three polymers (A), (B) and (C) has no need of plastisicers which create problems of migration especially for food packaging. However, quantities of plasticisers less than 10% with respect to the polymers (B+C) can be added.

Various additives such as antioxidants, UV stabilisers such as Lowilite Great Lake or Tinuvin Ciba, heat stabilisers and hydrolysis stabilisers, flame retardants, slow release agents, organic and inorganic fillers such as, for example, natural fibres, anti-static agents, humectants, colorants and lubricants can also be incorporated in the mixture.

In particular, in the production of blown or cast film it is possible to add silica, calcium carbonate, talc, kaolin, kaolinite, zinc oxide, various wollastonites and in general lamellar inorganic substances, whether or not functionalised with organic molecules, capable of delamellating in the mixing phase with the polymer mixture or with one of the individual polymers of the mixture to give nanocomposites with improved anti blocking and barrier properties. The various inorganic substances can be used in mixtures or with individual products. The concentration of the inorganic additives is generally between 0.05 and 70%, preferably between 0.5 and 50%, more preferably between 1 and 30%.

In the case of fibres and natural fillers such as cellulose fibres, sisal, ground nuts, maize husks, rice, or soya chaff and the like the preferred concentrations lie in the range 0.5 to 70%, more preferably from 1–50%. It is also possible to fill these materials with mixed inorganic and vegetable fillers.

To improve the film-forming characteristics amides of aliphatic acids such as oleamide, stearamide, erucamide, behenamide, N-oleylpalmitamide, N-stearylerucamide and other amides, salts of fatty acids such as stearates of aluminium, zinc or calcium and the like can be added. The quantities of these additives vary from 0.05 to 7 parts and preferably between 0.1 and 5 parts of the mixture of polymers.

The mixture thus obtained can be transformed into a film by blowing or extrusion with a flat head. The transparent film is strong and perfectly weldable. It can be obtained in thicknesses to 5 µm by blowing or casting. The film can be transformed into sacks, carrier bags, film and bags for packaging food, extensible film and heat-shrink film, film for adhesive tapes, for nappies, for coloured ornamental tapes. Other principle applications are sacks for silage, sacks for fruit and vegetables with good breathbility, sacks for bread and other foods, films for covering trays of meat, cheese and other foods, and pots for yoghurt. The film can also be biorientated.

The film obtained from the compositions according to the present invention can moreover be utilised as components of multi layer films composed of at least one layer of polylactic acid or from other polyesters, de-structured or non-de-structured starch and its blends with synthetic and natural polymers, or as a component of a multi layer with aluminium and other materials or with a vacuum-metalised layer with aluminium, silica and other inorganic materials. The multi layers can be obtained by co-extrusion, lamination or extrusion coating, if one layer is paper, woven or non-woven textile, another layer of biodegradable material or other material which does not melt at the extrusion temperature of the film. The layer constituted by the material of the present invention will have the characteristic of a high resistance to UV even without the introduction of any UV stabiliser. This is a particularly important factor for a biodegradable film which must degrade in the ground without leaving residues.

The mixture of the present invention can be used in the form of at least one layer of a multi layer film in which at least one other layer can comprise an aliphatic-aromatic polyester, in particular polyalkylene terephthalate-adipate, preferably with a teraphthalic acid content with respect to the sum of acids less than 60 mole %, or a blend thereof with de-structured starch or with polylactic acid or their combinations. The layer other than the mixture according to the invention can also be constituted by destructured starch suitably plasticised and/or complexed.

The films can be used for agricultural mulching, greenhouse cladding, packaging for straw and various forages. They can also contain UV stabilisers, they can be in the form of individual films or co-extruded, as in the case of materials based on starch, to give improved UV resistance, improved barrier properties, and slower degradation in the atmosphere and in the ground. The material obtained can also be utilised to obtain fibres for woven and non-woven textiles or for fishing nets. Moreover, the non-woven fabric can be used in the sector of nappies, sanitary towels etc. The fibres can also be utilised as weldable reinforcing fibres in special papers. The material can be utilised with success also for the production of extruded or co-extruded sheets for thermoforming with other layers of polymers such as polylactic acid, other polyesters or polyamides, materials based on starch and other materials and then thermoformed into trays for food, agricultural containers and others.

The material can have additives such as polymeric additives like waxes, polyethylene and polypropylene, PET and PBT, polystyrene, copolymers of ethylene and propylene with functional carboxylic, carboxylate, methacrylate, acrylate groups, or hydroxylic groups, or combined with these polymers in coextrusion, coinjection or the like. The material can be utilised as a matrix in a blend with de-structured starch according to the processes described in EP-0 327 505, EP-539 541, EP-0 400 532, EP-0 413 798, EP-0 965 615 with the possibility of forming complexes with starch.

They can be utilised as coating films for biodegradable foam materials based on polyesters, polyamides, thermoplastic starches, complex starches or simply blends of starch with other polymers or with the material of the present invention.

The material, on its own or in mixture with starch or other polymers, can be obtained as a foam material to produce containers for fruit and vegetables, meat, cheese and other food products, containers for fast food or in the form of expanded agglomerable balls for expanded moulded work pieces for industrial packaging. They can be used as foam materials in place of expanded polyethylene. They can also find applications in the non-woven and woven textile fibre sector for clothing, sanitary products and industrial applications, as well as in the sector of fishing nets or nets for fruit and vegetables.

The mixture of biodegradable polyesters according to the invention will now be illustrated by means of several non-limitative examples.

EXAMPLES

Example 1

Polymers constituting the mixture:

50% poly-$\epsilon$-caprolactone (A): Union Carbide Tone 787;

40% aliphatic polyester (B): polybutylene sebacate produced from sebacic acid and butandiol with monobutylstannoic acid catalyst according to example 1 of WO 00/55236:

10% polymer of polylactic acid (C): 4040 Cargill with a 6% content of D-lactic (MFI=4 dg/min).

Mixing of polymers in OMC extruder:

58 mm diameter; L/D=36; rpm=160; temperature profile 60–120–160×5–155×2 Consumption=80A, flow rate= 40 Kg/h Filmformation on a Ghioldi machine;

Diameter=40 mm, L/D=30, rpm=45; die: diameter=100 mm; air gap=0.9 mm; land=12; flow rate=13.5 Kg/h; temperature profile: 110–130–145×2; temperature filter=190×2; head temperature=190×2.

Film: width=400 mm; thickness=25 µm.

Determination of the values of transmittance effected at the entrance port (Tentr) was made by means of the HAZE-GUARD SYSTEM XL-211 measuring instrument.

The values of the modulus of elasticity (E), breaking load ($\sigma$), breaking elongation ($\epsilon$) and breaking energy ($En_{break}$) were determined in accordance with ASTM D 882-91 by means of an INSTRON 4502 instrument.

The tensile properties were repeated at different exposure times to a Philips TL20W/12 UV lamp. In particular, samples in accordance with ASTM D 882-91 were fixed to a disc rotating at a speed of 40 revolutions per minute positioned at a distance of 12 cm from the UV lamp.

The results of the test were plotted in table 1. Examples 3a–c and 4a–b are comparison examples.

TABLE 1

| Sample | A % | B % | C % | A/ A − B | C/ A + B + C | Tentr % | UV exposure (hours) | E (MPa) | σ (MPa) | ε (%) | En break KJ/m² | Average Reduction |
|---|---|---|---|---|---|---|---|---|---|---|---|---|
| 1 | 50 | 40 | 10 | 55.5 | 10 | 92.9 | 0 | 652 | 32 | 638 | 7398 | — |
| 2 | 50 | 40 | 10 | 55.5 | 10 | 92.9 | 264 | 725 | 29 | 658 | 7347 | 2.3 |
| 3a | 100 | 0 | 0 | 100 | 0 | 94.5 | 0 | 510 | 52 | 650 | 8500 | — |
| 3b | 100 | 0 | 0 | 100 | 0 | 94.5 | 120 | 495 | 40 | 585 | 6350 | 19.5 |
| 3c | 100 | 0 | 0 | 100 | 0 | 94.5 | 216 | 560 | 26 | 325 | 3200 | 54.1 |
| 4a | 0 | 100 | 0 | 0 | 0 | 94 | 0 | 624 | 46 | 646 | 10330 | — |
| 4b | 0 | 100 | 0 | 0 | 0 | 94 | 216 | 698 | 31.5 | 487 | 5961 | 32.8 |

What is claimed is:

1. A biodegradable mixture of polyesters comprising:
   (A) a polyhydroxy acid of poly-ε-caprolactone and its copolymers with a molecular weight $M_w$ greater than 50,000;
   (B) a polyester of a diacid and a diol with a molecular weight $M_w$ greater than 60,000 and a melting point lying between 50 and 90° C.;
   (C) a polymer of lactic acid which contains at least 75% L-lactic or D-lactic acid or their combinations with a molecular weight $M_w$ greater than 30,000 in which the concentration of (A) varies with respect to (A+B) in the range of between 40 and 70% by weight, and the concentration of C with respect to (A+B+C) lies between 2 and 30 by weight and with a UV stability measured on film of 25–30 μm which has an average reduction in its tensile properties after 216 hours of exposure to UV rays less than 30% considered as the average reduction in breaking load, elongation at breakage and longitudinal breaking energy.

2. A biodegradable mixture of polyesters according to claim 1, in which the aliphatic polyester (B) has a modulus of elasticity lying between 200 and 900 MPa and a breaking elongation greater than 200%, for film with a thickness 25–30μm produced by blown film formation.

3. A biodegradable mixture of polyesters according to claim 1 in which the polymer of lactic acid (C) has a modulus of elasticity greater than 1500 MPa.

4. A biodegradable mixture of polyesters according to claim 1, in which the aliphatic polyester (B) has a melting point lying between 55 and 85° C.

5. A biodegradable mixture of polyesters according to claim 1, in which the diacid content of the aliphatic polyester (B) in azelaic acid, sebacic acid, brassylic acid, or mixtures of these in concentrations, with respect to the total acid, greater than 50 mole %.

6. A biodegradable mixture of polyesters according to claim 1, combined with de-structured starch, raw starch or modified starch in which the starch is in dispersed phase, complexed or not complexed.

7. A film produced by mixtures of biodegradable polymers according to claim 1.

8. A film according to claim 7 characterized by a bidirectional tear resistance with the Elmendorf test lying between 5 and 100 N/mm.

9. A film according to claim 8 characterized in that the ratio between the tear resistance values according to the Elmendorf test in the transverse and longitudinal directions lies between 4.5 and 0.4.

10. A film according to claim 7, characterized in that the value of the modulus of elasticity lies between 200 and 1200 MPa.

11. A multi layer film constituted by one or more layers of material according to claim 1, and at least one layer of material comprising aliphatic/aromatic polyester as such or in a blend with other polyesters and/or with de-structured starch.

12. A multi layer film according to claim 11, in which the aliphatic/aromatic polyester is polybutylene terephthalate-adipate with a ratio between teraphthalic and adipic acid less than 65 mole %, in a blend with de-structured starch and optionally polylactic acid.

13. A transparent agricultural mulch, or green-house cover or packaging for straw and forage comprising the film according to claim 7.

14. Packaging for food or container for organic residues comprising the film according to claim 7.

15. A solid sheet produced from mixtures according to claim 1 for food containers, pots for fish breeders, or industrial containers in general.

16. An expanded sheet produced from mixtures according to claim 1 for food or other containers or for industrial packaging.

17. Fibres produced from mixtures according to claim 1 for woven or non-woven textiles for use in industrial, clothing and sanitary sectors.

18. A coating material produced from mixtures according to claim 1 for application to paper, woven or non-woven fabric, or other layers of solid or expanded biodegradable material.

19. A biodegradable mixture of polyesters according to claim 1, in which the concentration of C with respect to (A+B+C) lies between 5 and 25% by weight.

20. A biodegradable mixture of polyesters according to claim 2, in which the aliphatic polyester (B) has a breaking elongation greater than 300% for film with a thickness of 25–30 μm produced by blown film formation.

21. A biodegradable mixture of polyesters according to claim 4, in which the aliphatic polyester (B) has a melting point lying between 57 and 80° C.

22. A biodegradable mixture of polyesters according to claim 5, in which the diacid content of the aliphatic polyesters (B) in azelaic acid, sebacic acid, brassylic acid, or mixtures of these in concentrations, with respect to the total acid, is greater than 70 mole %.

23. A film according to claim 8 characterized by a bidirectional tear resistance with the Elmendorf test lying between 7 and 90 N/mm.

24. A film according to claim 23 characterized by a bidirectional tear resistance with the Elmendorf test lying between 10 and 80 N/mm.

25. A film according to claim 10 characterized in that the value of the modules of elasticity lies between 300 and 1000 Mpa.

* * * * *